United States Patent
Klaiber et al.

(10) Patent No.: US 7,636,815 B1
(45) Date of Patent: Dec. 22, 2009

(54) SYSTEM AND METHOD FOR HANDLING DIRECT MEMORY ACCESSES

(76) Inventors: Alexander C. Klaiber, 231 Sierra Vista Ave., Mountain View, CA (US) 94043; Guillermo J. Rozas, 104 Magneson Ter., Los Gatos, CA (US) 95032; David Dunn, 4525 191$^{st}$ Pl. NE., Sammamish, WA (US) 98074

( * ) Notice: Subject to any disclaimer, the term of this patent is extended or adjusted under 35 U.S.C. 154(b) by 391 days.

(21) Appl. No.: 10/411,168

(22) Filed: Apr. 9, 2003

(51) Int. Cl.
G06F 12/00 (2006.01)
(52) U.S. Cl. ..................... 711/146
(58) Field of Classification Search ........... 711/146, 711/143, 153
See application file for complete search history.

(56) References Cited

U.S. PATENT DOCUMENTS

| | | | | |
|---|---|---|---|---|
| 5,345,576 A | * | 9/1994 | Lee et al. ............... | 711/122 |
| 5,644,753 A | * | 7/1997 | Ebrahim et al. .......... | 711/131 |
| 5,704,058 A | * | 12/1997 | Derrick et al. .......... | 711/168 |
| 5,761,468 A | | 6/1998 | Emberson ............... | 712/207 |
| 5,860,111 A | * | 1/1999 | Martinez et al. ......... | 711/143 |
| 5,897,656 A | | 4/1999 | Vogt et al. ............. | 711/141 |
| 5,953,538 A | * | 9/1999 | Duncan et al. ........... | 710/22 |
| 6,088,769 A | | 7/2000 | Luick et al. ............ | 711/141 |
| 6,122,714 A | | 9/2000 | VanDoren et al. ......... | 711/150 |
| 6,128,701 A | | 10/2000 | Malcolm et al. | |
| 6,128,702 A | | 10/2000 | Saulsbury et al. ........ | 711/133 |
| 6,205,517 B1 | * | 3/2001 | Sugaya ................. | 711/117 |
| 6,219,745 B1 | * | 4/2001 | Strongin et al. ......... | 711/100 |
| 6,345,320 B1 | * | 2/2002 | Kawamata et al. ........ | 710/22 |
| 6,438,653 B1 | | 8/2002 | Akashi et al. | |
| 6,535,960 B1 | * | 3/2003 | Nishida et al. .......... | 711/129 |
| 6,546,464 B2 | | 4/2003 | Fortuna et al. .......... | 711/141 |
| 6,633,958 B1 | | 10/2003 | Passint et al. .......... | 711/141 |
| 6,638,653 B2 | | 10/2003 | Andou et al. | |
| 6,662,277 B2 | | 12/2003 | Gaither ................ | 711/141 |
| 6,668,287 B1 | | 12/2003 | Boyle et al. | |
| 6,785,780 B1 | * | 8/2004 | Klein et al. ............ | 711/148 |
| 6,868,481 B1 | | 3/2005 | Gaither et al. .......... | 711/119 |
| 6,925,536 B2 | | 8/2005 | Glasco et al. ........... | 711/141 |
| 2003/0005237 A1 | | 1/2003 | Dhong et al. | |
| 2003/0131202 A1 | | 7/2003 | Khare et al. | |
| 2003/0163745 A1 | * | 8/2003 | Kardach ............... | 713/320 |

OTHER PUBLICATIONS

Agarwal et al., The MIT Alewife Machine, Mar. 1999, Proceedings of the IEEE, vol. 87, No. 3, pp. 430-444.

(Continued)

*Primary Examiner*—Hiep T Nguyen

(57) ABSTRACT

Methods and systems for efficiently processing direct memory access requests coherently. An external agent requests data from the memory system of a computer system at a target address. A snoop cache determines if the target address is within an address range known to be safe for external access. If the snoop cache determines that the target address is safe, it signals the external agent to proceed with the direct memory access. If the snoop cache does not determine if the target address is safe, then the snoop cache forwards the request on to the processor. After the processor resolves any coherency problems between itself and the memory system, the processor signals the external agent to proceed with the direct memory access. The snoop cache can determine safe address ranges from such processor activity. The snoop cache invalidates its safe address ranges by observing traffic between the processor and the memory system.

40 Claims, 8 Drawing Sheets

OTHER PUBLICATIONS

Handy, Jim., The Cache Memory Book, 1998, Academic Press, $2^{nd}$ edition, pp. 155-169.

Jouppi, Norman P., Improving Direct-Mapped Cache Performance by the Addition of a Small Fully-Associative Cache and Prefetch Buffers, Proceedings of the $17^{th}$ Annual International Symposium on Computer Architecture, at 384-373 (IEEE 1990).

CPU Cache, From Wikipedia, the free encyclopedia Http: //en.wikipedia.org/wiki/CPU. 18 pages. 2009.

Anant Agarwal; et al. "The MIT Alewife Machine", Laboratory for Computer Science, Massachusetts Institute of Technology Cambridge, Massachusetts, 02139.

Non Final Office Action, Mail Date Apr. 7, 2008;U.S. Appl. No. 11/439,361.

Notice of Allowance, Mail Date Jun. 12, 2009; U.S. Appl. No. 11/439,361.

Notice of Allowance, Mail Date Aug. 26, 2008; U.S. Appl. No. 11/439,361.

Notice of Allowance, Mail Date Dec. 12, 2008; U.S. Appl. No. 11/439,361.

Restriction Requirement, Mail Date Feb. 21, 2008; U.S. Appl. No. 11/439,361.

Final Rejection, Mail Date Feb. 25, 2009; U.S. Appl. No. 11/102,289.

Final Rejection, Mail Date Sep. 28, 2007; U.S. Appl. No. 11/102,289.

Non Final Office Action, Mail Date Mar. 23, 2007; U.S. Appl. No. 11/102,289.

Non Final Office Action, Mail Date May 12, 2009; U.S. Appl. No. 11/102,289.

Non Final Office Action, Mail Date Jun. 12, 2008; U.S. Appl. No. 11/102,289.

Final Rejection, Mail Date Mar. 16, 2009; U.S. Appl. No. 11/102,171.

Final Rejection, Mail Date Nov. 26, 2007; U.S. Appl. No. 11/102,171.

Non Final Office Action, Mail Date Mar. 26, 2007; U.S. Appl. No. 11/102,171.

Non Final Office Action, Mail Date Jul. 09, 2008; U.S. Appl. No. 11/102,171.

Notice of Allowance Dated Mar. 12, 2009; U.S. Appl. No. 11/439,361.

Notice of Allowance Dated Jun. 26, 2009; U.S. Appl. No. 11/439,361.

* cited by examiner

SYSTEM AND METHOD FOR HANDLING DIRECT MEMORY ACCESSES

TECHNICAL FIELD

Embodiments of the present invention relate to the field of computer architecture. More specifically, embodiments of the present invention relate to the field of maintaining coherency between a memory system and a processor while supporting direct memory access.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be apparent, however, to one skilled in the art, upon reading this disclosure, that the present invention may be practiced without these specific details. In other instances, well-known structures and devices are not described in detail in order to avoid obscuring aspects of the present invention.

Figure 1:
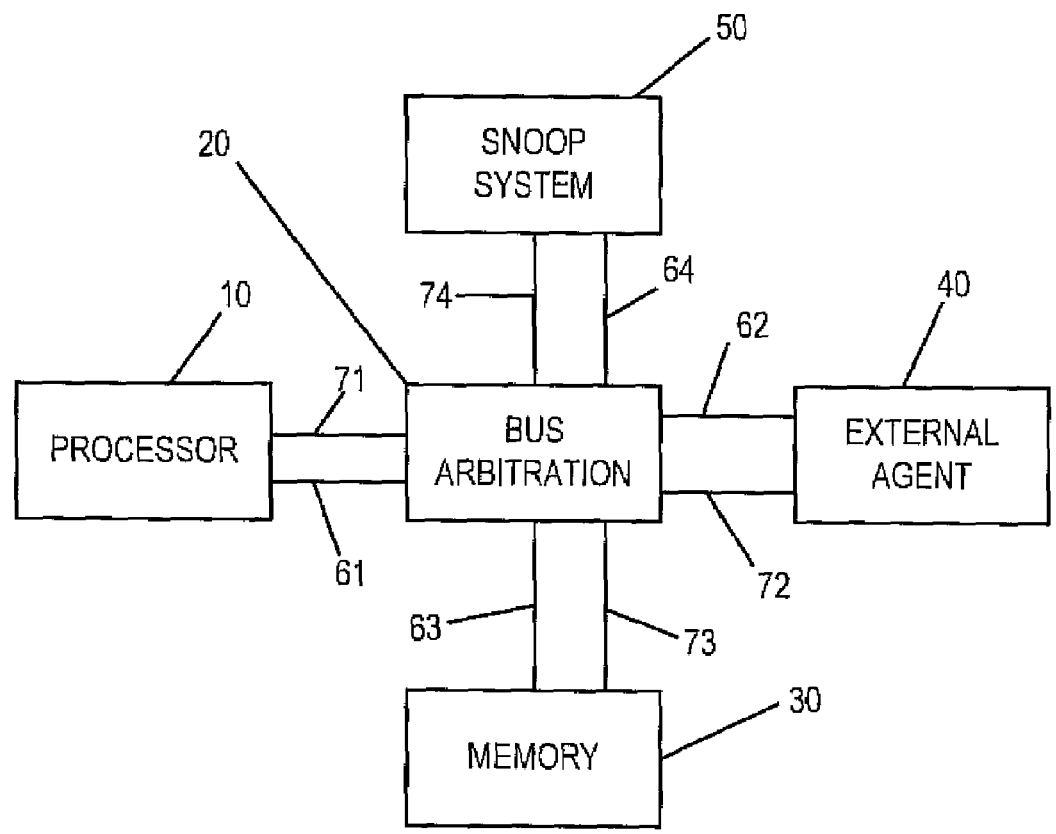
FIG. 1 is a block diagram of a computer system comprising an embodiment of the present invention.

FIG. 1 shows a block diagram of an exemplary embodiment of the present invention. A processor 10 issues an address on address bus 61. Bus arbitration unit 20 routes that address to to the memory system 30 on address bus 63. The memory system provides the data at the indicated address on data bus 73 that is in turn connected to data bus 71. Alternatively, the processor 10 can also send data to the memory system on data bus 71 and data bus 73. Similarly, an external agent 40 can access the data in the memory system 30 through address bus 62 and data bus 72.

The processor 10 manipulates data in accordance with a computer program also stored in memory. For efficient operation, the processor 10 caches data and programs locally. To support caching, data is transferred in blocks between the processor 10 and the memory system 30 from time to time. This introduces the potential for coherency problems because the cached data corresponding to a particular address may be changed from the data stored in the memory system 30 at that address. An important part of the correct operation of the entire computer system is maintaining coherency between the cached data in the processor 10 and the corresponding data in the memory system 30.

Figure 2:
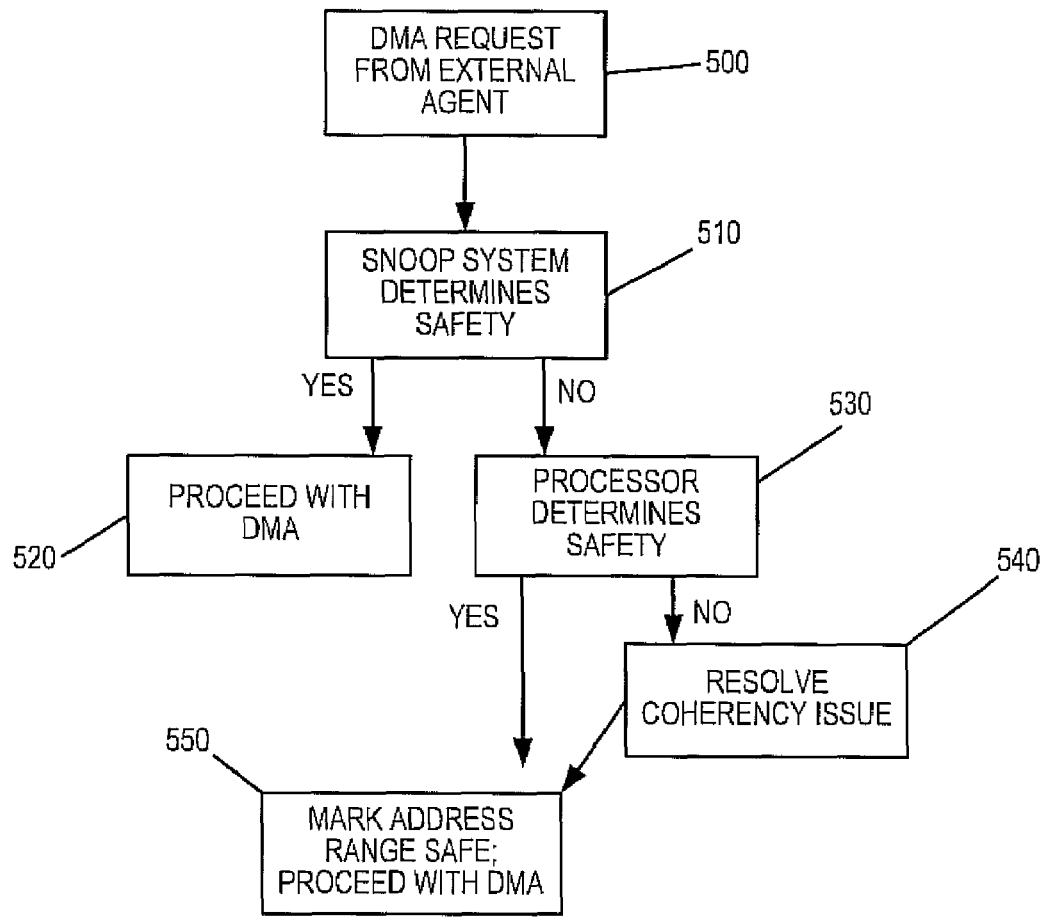
FIG. 2 is a flow diagram of illustrating the use of an embodiment of a snoop system to check the safety of a DMA request in accordance with the present invention.

The snoop system 50, in accordance with an embodiment of the present invention, observes traffic among the other units and maintains information about various address ranges that are safe in a safe address range store. A "safe" address range is one where the data corresponding to that address range in the memory system 30 is also cached in the processor 10. In contrast, an "unsafe" address range is one where some data corresponding to that address range is within the processor. The computer system of FIG. 1 processes an external direct memory access (DMA) request as shown in the flow diagram of FIG. 2. In step 500, the external agent 40 makes a DMA request by signaling the bus arbitration unit 20. The DMA request specifies at least a target address and whether the request was a read or a write.

In step 510, the snoop system 50 determines if the target address is safe. If the snoop system 50 makes that determination, then the DMA request is handled directly by the memory system 30 and the bus arbitration unit 20 in step 520. If the snoop system 50 does not determine that the DMA request is safe, then the DMA request is passed on to the processor 10.

The processor 10 determines if the DMA request is unsafe by examining its own caches, store buffers and other supporting data structures in step 530. If the processor 10 determines that the DMA request is safe, the processor 10 provides a safe signal to the external agent 40 to proceed with the DMA request in step 550. In addition, the snoop system 50 observes the safe signal and internally marks the address range containing the DMA request as safe. In an alternate embodiment, the processor 10 provides a safe signal to the snoop system 50 that in turn relays the signal to the external agent 40. In an alternate embodiment, the external agent 40 relays the safe signal to the snoop system 50.

If step 530 reveals that the DMA request is unsafe, then the processor 10, through appropriate techniques such as cache control instructions, moves appropriate data into the memory system 30 if required and marks the processor's own copy of data invalid as appropriate in step 540. This renders the memory system 30 and the processor 10 coherent, thus making it safe to process the DMA request. The processor 10 then provides a safe signal to the external agent 40 to proceed with the DMA request and to the snoop system 50 to mark the address range as safe as described in step 550.

Figure 3:
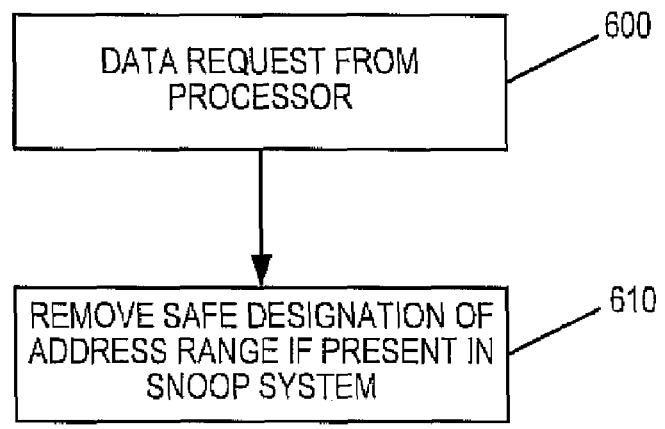
FIG. 3 is a flow diagram illustrating the use of an embodiment of a snoop system to remove an address range from a snoop system in accordance with the present invention.

In one embodiment, the snoop system 50 begins operation with no safe address ranges stored. The snoop system 50 adds a safe address range containing the target address of a DMA request upon receipt of a safe signal from processor 10 corresponding to that DMA request as described in step 550 of FIG. 2. FIG. 3 shows the steps for removing a safe address range from the snoop system 50. In step 600, the processor 10 initiates a transaction to the memory system 30. In step 610, the snoop system 50 removes a safe address range from its collection if data corresponding to an address in that address range moves between the processor 10 and the memory system 30. The snoop system 50 may also remove a safe address range if it runs out of storage capacity. In an alternate embodiment, the processor 10 can programmatically add safe address ranges to the snoop system 50. In an alternate embodiment, the processor 10 generates a safe signal when data was leaving the processor 10 and processor 10 had no cached copies of the data.

In one embodiment, a safe address range comprises a base address and block size. A target address that is greater than or equal to the base address and less than the base address plus the block size is determined to be safe. In another embodiment, the block size is of size $2^G$ and the least significant G bits of the base address are 0. This type of safe address range will be referred to as an aligned range of granularity G.

In one embodiment, the snoop system 50 also contains information to indicate that an address range was safe for reading only or safe for both reading and writing. If read-only data was moving into the processor 10 from an address in a safe range, then the snoop system 50 marks that safe range as safe for reading only. This permits the snoop system 50 to authorize an external agent 40 to read from that safe range, but pass on the request to write to that safe range to the processor 10.

In an alternate embodiment, upon a first reference to an address in a safe range by the processor 10, the snoop system 50 marks the address as unsafe for both reading and writing. Upon a request by the external agent 40 to that address, the snoop system 50 passes on the request to the processor 10. The processor 10 determines that the data corresponding to that safe range is suitable for read-only access and signals the snoop system 50 with that information.

The snoop system 50 marks the safe range as safe only for reading. In one embodiment, there are multiple processors and the snoop system 50 stores additional information to relating the safety of the address range to each processor. In one embodiment, there are multiple external agents. In alternate embodiments, processor 10 may have one or more levels each of data and instruction caches. Processor 10 may also buffer memory accesses internally.

Figure 4:
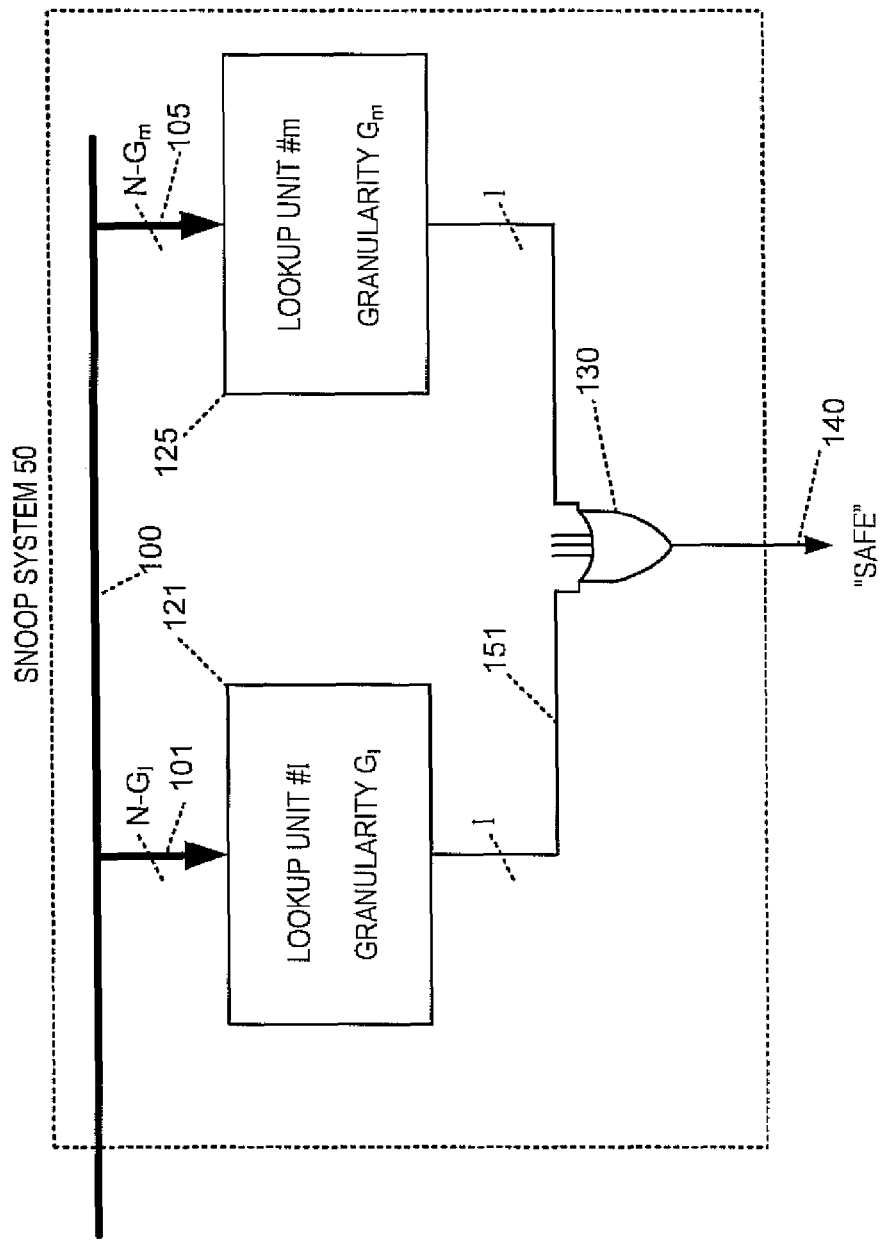
FIG. 4 is a block diagram of an embodiment of a snoop system with multiple look-up units in accordance with the present invention.

FIG. 4 shows an exemplary implementation of a snoop system 50 with multiple look-up units 121, 125 in accordance with one embodiment of the present invention. A snoop system 50 may have one, two or more look-up units 121, 125. A particular look-up unit 121 evaluates the safety of a target address on input bus 101 for a particular block size. In the implementation shown, each look-up unit may support an aligned range with a particular granularity $G_i$. Thus, the look-up input 101 need only use the high order $N-G_1$ bits of the input bus 101, where N is the number of bits in the input bus 101.

A look-up unit 121 generates a look-up output 151 having value of one if that look-up unit determines that the target address is within a safe address range stored within that look-up unit and produces a zero otherwise. OR gate 130 combines the results from all look-up units to produce a final result 140 for the system. Note that in one embodiment if all of the results from each lookup unit 121 are zero, it does not necessarily follow that the target address is unsafe. Rather, the zero result implies that the target address is not known to be safe and that further evaluation by processor 10 is required.

A cache is a system that takes an input and determines if that input matches a key already stored in the system. If so, the system produces an output indicating a hit. If the input does not match, then the system indicates a miss. In one embodiment, a cache can also contain a data entry corresponding to each stored key. If the there is a hit, then the cache also provides the value in the entry corresponding to the key that resulted in the hit. A cache could be implemented in numerous equivalent ways, such as direct-mapped, set associative, or fully associative cache, or as a combination of content addressable memories and RAMs or as a combination of memory hardware and software.

In one embodiment, a look-up unit 121 of FIG. 4 supporting an N bit target address with an aligned range with granularity G may be implemented as a cache that can compare keys and inputs of N-G bits with no entries. The signal indicating a hit or miss may be the look-up unit output 151.

Figure 5:
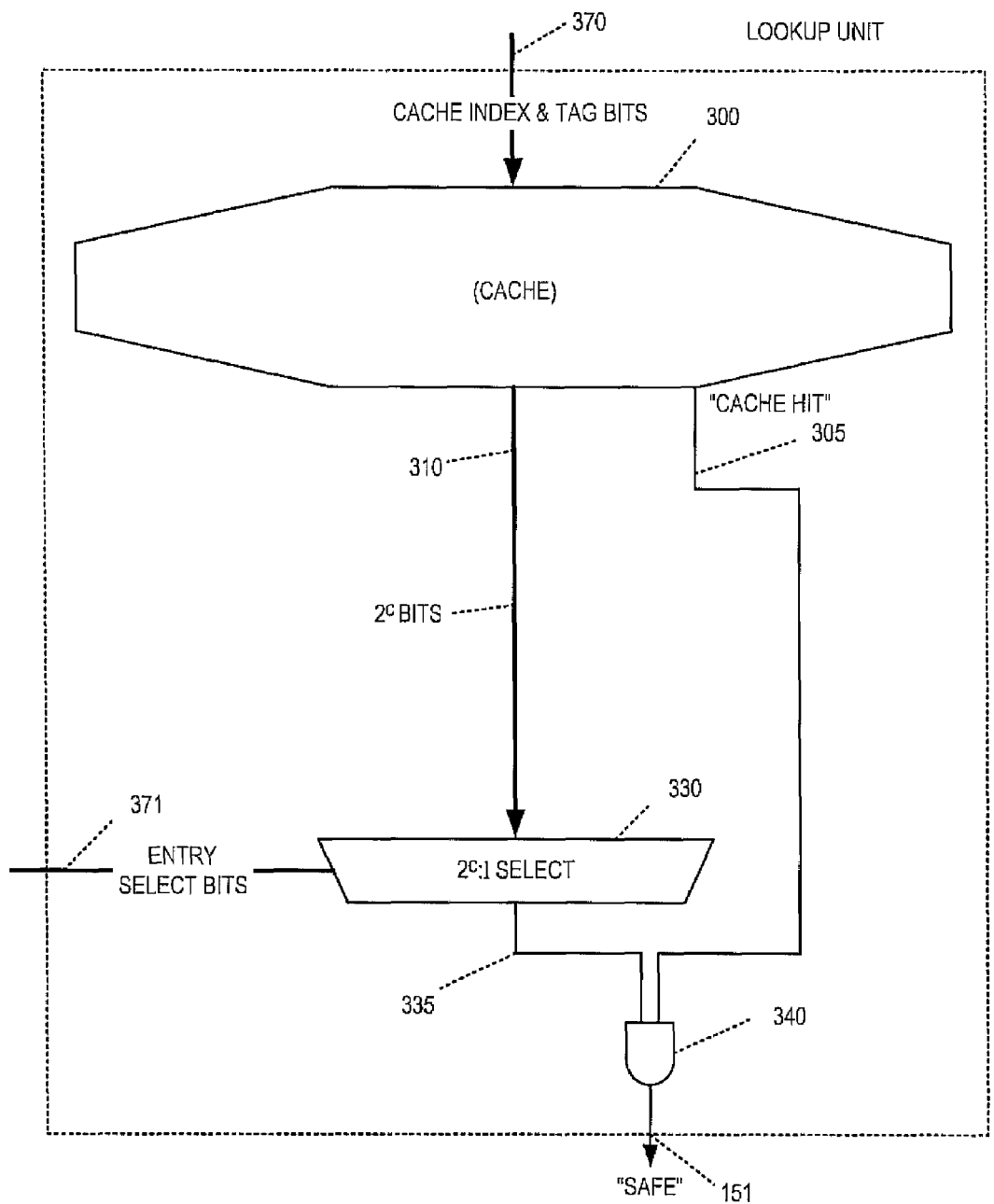
FIG. 5 is a block diagram of an embodiment of a look-up unit using an expanded cache entry in accordance with the present invention.
Figure 6:
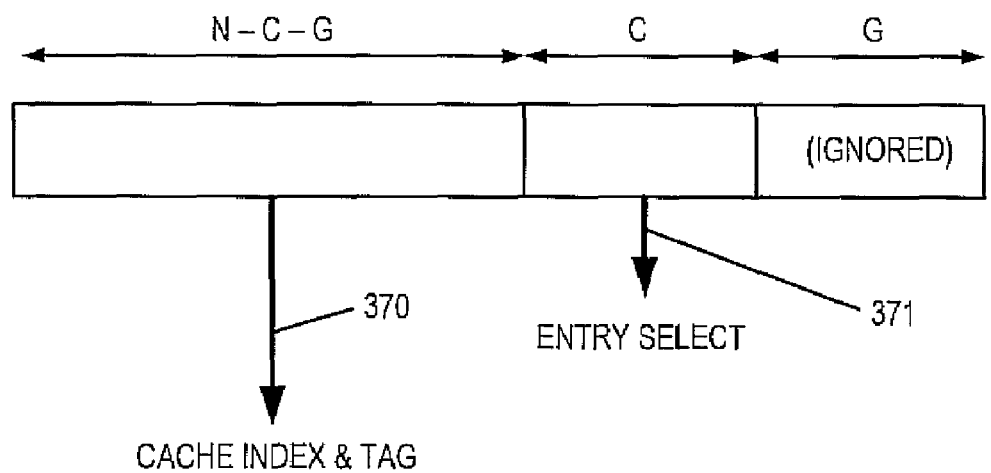
FIG. 6 shows the usage of N bits of a target address for the embodiment of the look-up unit in FIG. 5.

FIG. 5 shows an additional embodiment of a look-up unit 121 implementing an aligned range of granularity G that will process an N bit address. In this embodiment, each entry of the cache 300 has $2^C$ bits to support clustering level C. Each bit stores the safety state of one of $2^C$ contiguous blocks, with each block having $2^G$ bytes in it. FIG. 6 shows the break down of an N bit address. The high order N-C-G bits are used as the cache index input 370. Then next C bits are used as an entry select input 371. The cache 300 responds to the cache index input 370 by producing an entry output 310 with $2^C$ bits and a cache hit signal 305. The cache hit signal 305 indicates that the entry output 310 is valid. The entry bit selector 330 uses the entry select input 371 to pick one of the $2^C$ bits in the entry output 371 as the chosen entry safety bit 335. And gate 340 computes the look-up output 151 as the logical "and" of the cache hit signal 305 and the chosen entry safety bit 335.

Figure 7:
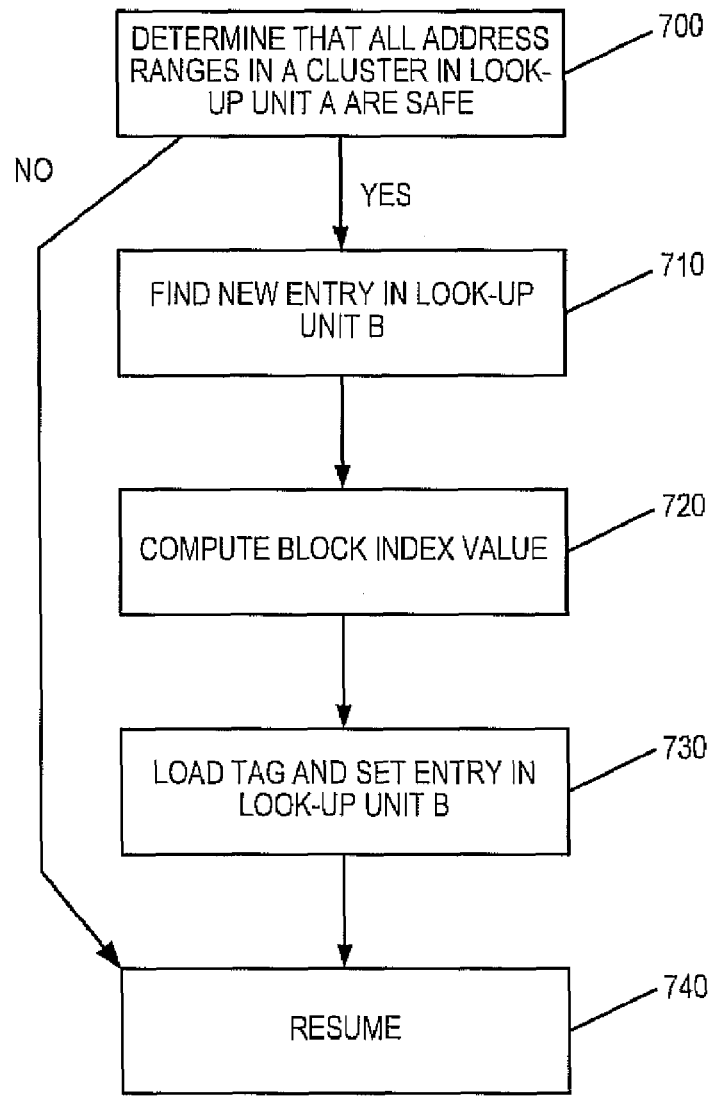
FIG. 7 is a flow diagram illustrating the use of an embodiment of a snoop system to upgrade an entry in accordance with the present invention.
Figure 8A:
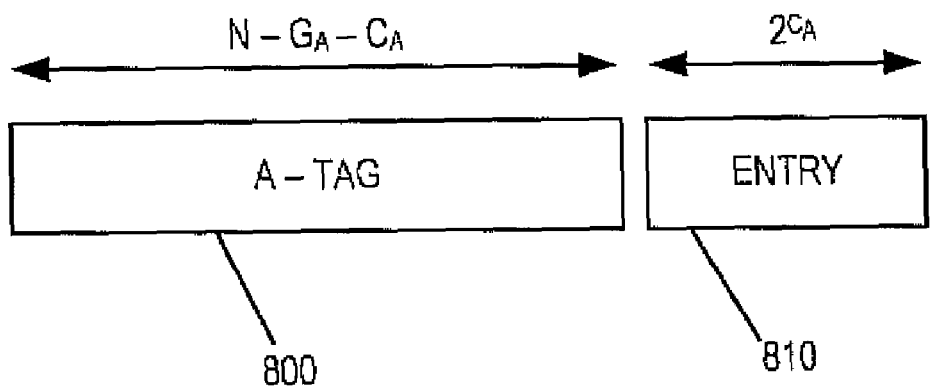
FIGS. 8A and 8B are a block diagram illustrating the structure of tags and entries for a snoop system upgrading an entry using the embodiment of the method shown in FIG. 7.
Figure 8B:
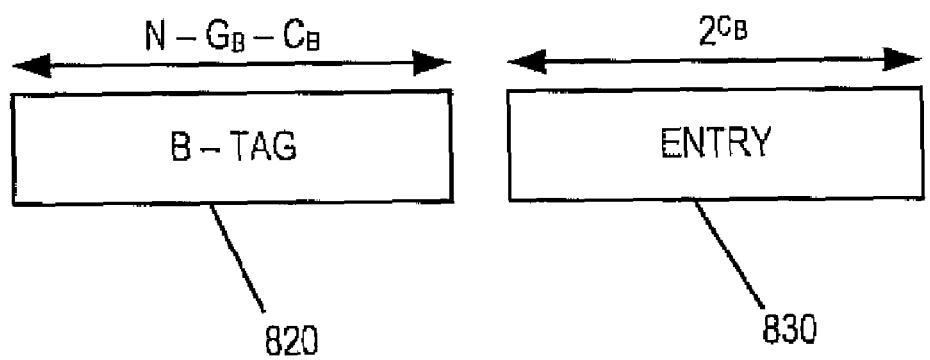

FIG. 7 shows a flow diagram for the process of upgrading an entry in an embodiment supporting an N bit address with (i) a first look-up unit (look-up unit "A") supporting an aligned range with granularity $G_A$ and clustering level $C_A$, and (ii) a second look-up unit (look-up unit "B") supporting an aligned range with granularity $G_B$ and clustering level $C_B$ with the relationship that $G_A+C_A=k+G_B$ for a non-negative integer k and $C_B \geq k$. (In one embodiment, the arrangement of units A and B would be similar to that shown in FIG. 4.) FIG. 8A shows the arrangement of bits for an entry in a cache in look-up unit A. The A-tag 800 has $N-G_A-C_A$ bits while A-entry 810 has $2^{C_A}$ bits. FIG. 8B shows the arrangement of bits for an entry in a cache in look-up unit B. The B-tag 820 has $N-G_B-C_B$ bits while B-entry 830 has $2^{C_B}$ bits. The A-tag 800 and the B-tag 820 store the tag and indices necessary to operate their respective caches.

In step 700, the snoop system 50 determines if all bits in A-entry 810 are set to a safe state. If so, then in step 710, the snoop system 50 creates a new entry in a cache in look-up unit B. The B-tag 820 for the new entry would be the top $N-G_B-C_B$ bits of A-tag 800. In step 720, compute the block index value as the remaining bits of A-tag 800. In step 730, the B-entry 830 would be set to the not safe state except for a block of $2^k$ bits that would be set to indicate a safe state. For an implementation where the bits of the block are indexed from a least significant bit index of 0 to a most significant bit index of $2^{C_B}-1$, the least significant bit of the block would be 2 raised to the block index value. In step 740, the snoop system 50 resumes normal operation.

In one embodiment, the method aborts at step 710 if there are no free entries in the cache of look-up unit B. In an alternate embodiment, the A-tag 800 and A-entry 810 are removed from look-up unit A. It should also be appreciated that one can reorder the bits of the block in other equivalent ways.

In an alternate embodiment, there are more than two look-up units supporting the process of upgrading an entry each having different granualarities.

It should also be appreciated that the each embodiment may also be implemented in other equivalent manners without departing from the scope and spirit of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing coherent access to memory, said method comprising:
   receiving a target address;
   determining if said target address is safe and responsive thereto producing a signal indicating a result, wherein said target address is determined to be safe if a cached data corresponding to said target address is the same as a data stored in a memory system; and
   forwarding said target address to a processor if said signal fails to indicate that said target address is safe.

2. The method of claim 1, wherein said determining comprises:
   accessing a safe address range store to evaluate if said target address is safe.

3. The method of claim 2, further comprising:
   storing a range containing said target address in said safe address range store upon receipt of a safe signal from said processor.

4. The method of claim 2, wherein said safe address range store comprises a cache and wherein further said cache comprises a cache entry holding safety information for at least two safe address ranges.

5. The method of claim 1, wherein said determining comprises:
   evaluating the safety of said target address for at least two block sizes.

6. The method of claim 1, wherein said determining comprises:
   evaluating said target address against an aligned first safe addresses range with a first granularity.

7. The method of claim 6, wherein said determining comprises:
   evaluating said target address against an aligned second safe address range with a second granularity.

8. A computer system comprising:
   a processor; and
   a snoop system coupled to said processor, said snoop system comprising:
   a first look-up unit operable to store a safe address range, wherein said safe address range is an address for a cached data corresponding to a data stored in a memory system, and wherein said look-up unit is operable to store said safe address range with a first granularity, and wherein said snoop system further comprises:
   a second look-up unit operable to store a second safe address range with a second granularity.

9. The computer system of claim 8, wherein said processor comprises a first level cache.

10. The computer system of claim 9, wherein said processor comprises a second level cache.

11. The computer system of claim 8, further comprising:
    a second processor coupled to said snoop system.

12. A computer system comprising:
    a processor; and
    a snoop system operable to hold a state reflecting the absence of data in said processor corresponding to an address range, wherein said address range is aligned with a first granularity, and wherein said snoop system comprises:
    a second state reflecting the absence of data in said processor corresponding to a second address range with said second address range aligned with a second granularity.

13. The computer system of claim 12, wherein said processor comprises a first level cache.

14. The computer system of claim 13, wherein said processor comprises a second level cache.

15. A method of performing a direct memory access (DMA) operation comprising:
    monitoring traffic between a processor and a memory system and based thereon constructing safety information regarding a plurality of address ranges;
    in response to a request to perform a DMA operation involving a target address, evaluating said target address against said safety information to determine if said target address is safe, wherein said target address is determined to be safe if a cached data corresponding to said target address is the same as a data stored in a memory system;
    if said target address fails to evaluate safe, forwarding said DMA operation to said processor for further processing; and
    if said target address evaluates safe, allowing said DMA operation to occur between said memory system and a requesting agent.

16. The method as described in claim 15 wherein said safety information is stored within a cache memory.

17. The method as described in claim 16 further comprising:
    said processor resolving any coherency problems between itself and said memory system in response to said target address failing to evaluate safe; and
    said processor then allowing said DMA operation to occur between said memory system and said requesting agent.

18. The method as described in claim 17 wherein said processor comprises a cache memory.

19. The method as described in claim 15 wherein said monitoring comprises invalidating said safety information for a particular address if data incoherency is indicated by said traffic with regard to said particular address.

20. The method as described in claim 19 further comprising validating as safe addresses of said safety information in response to signals generated by said processor indicating that said addresses are safe.

21. A system for performing a direct memory access (DMA) operation comprising:
    a snoop circuit for monitoring traffic between a processor and a memory system and based thereon for constructing safety information regarding a plurality of address ranges, said snoop system coupled to said processor and said memory system via a bus architecture;
    in response to a request to perform a DMA operation involving a target address, said snoop circuit also for evaluating said target address against said safety information to determine if said target address is safe;

if said target address fails to evaluate safe, said snoop circuit further operable to forward said DMA operation to said processor for further processing; and if said target address evaluates safe, said snoop circuit further operable to allow said DMA operation to occur between said memory system and a requesting agent.

22. The system as described in claim 21 wherein said safety information is stored within a cache memory of said snoop circuit.

23. The system as described in claim 21 wherein said processor is for resolving any coherency problems between itself and said memory system in response to said target address failing to evaluate safe; and wherein further said processor is operable to then allow said DMA operation to occur between said memory system and said requesting agent.

24. The system as described in claim 23 wherein said processor comprises a cache memory.

25. The system as described in claim 21 wherein said snoop circuit performs said monitoring by invalidating said safety information for a particular address if data incoherency is indicated by said traffic with regard to said particular address.

26. The system as described in claim 25 wherein said snoop circuit is further for validating as safe addresses of said safety information in response to signals generated by said processor indicating that said addresses are safe.

27. A computer system comprising a processor coupled to a bus and a memory coupled to said bus, wherein said memory comprises instructions that when executed on said computer system implement a method of providing coherent access to memory, said method comprising:

receiving a target address;

determining if said target address is safe and responsive thereto producing a signal indicating a result, wherein said target address is determined to be safe if a cached data corresponding to said target address is the same as a data stored in a memory system; and forwarding said target address to said processor if said signal fails to indicate that said target address is safe.

28. The computer system of claim 27 wherein said determining comprises:

accessing a safe address range store to evaluate if said target address is safe.

29. The computer system of claim 28 wherein said method further comprises:

storing a range containing said target address in said safe address range store upon receipt of a safe signal from said processor.

30. The computer system of claim 28, wherein said safe address range store comprises a cache and wherein said cache comprises a cache entry holding safety information for at least two safe address ranges.

31. The computer system of claim 27, wherein said determining comprises:

evaluating the safety of said target address for at least two block sizes.

32. The computer system of claim 27, wherein said determining comprises:

evaluating said target address against an aligned first safe addresses range with a first granularity.

33. The computer system of claim 32, wherein said determining comprises:

evaluating said target address against an aligned second safe address range with a second granularity.

34. A computer system comprising:

means for receiving a target address;

means for determining if said target address is safe and responsive thereto for producing a signal indicating a result, wherein said target address is determined to be safe if a cached data corresponding to said target address is the same as a data stored in a memory system; and means for forwarding said target address to a processor if said signal fails to indicate that said target address is safe.

35. The computer system of claim 34, wherein said means for determining comprises:

means for accessing a safe address range store to evaluate if said target address is safe.

36. The computer system of claim 35, further comprising:

means for storing a range containing said target address in said safe address range store upon receipt of a safe signal from said processor.

37. The computer system of claim 35, wherein said safe address range store comprises a cache and wherein further said cache comprises a cache entry holding safety information for at least two safe address ranges.

38. The computer system of claim 34, wherein said means for determining comprises: means for evaluating the safety of said target address for at least two block sizes.

39. The computer system of claim 34, wherein said means for determining comprises:

means for evaluating said target address against an aligned first safe addresses range with a first granularity.

40. The computer system of claim 39, wherein said means for determining comprises:

means for evaluating said target address against an aligned second safe address range with a second granularity.

* * * * *

UNITED STATES PATENT AND TRADEMARK OFFICE
CERTIFICATE OF CORRECTION

PATENT NO.       : 7,636,815 B1                                        Page 1 of 1
APPLICATION NO.  : 10/411168
DATED            : December 22, 2009
INVENTOR(S)      : Klaiber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Ninth Day of November, 2010

David J. Kappos
*Director of the United States Patent and Trademark Office*